United States Patent
Choi

(10) Patent No.: US 12,410,290 B2
(45) Date of Patent: Sep. 9, 2025

(54) MONOVALENT ANION SELECTIVE ION EXCHANGE MEMBRANE

(71) Applicant: Toray Advanced Materials Korea Inc., Gyeongsangbuk-do (KR)

(72) Inventor: Young Woo Choi, Jeollabuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 812 days.

(21) Appl. No.: 17/635,313

(22) PCT Filed: Aug. 18, 2020

(86) PCT No.: PCT/KR2020/010951
§ 371 (c)(1),
(2) Date: Feb. 14, 2022

(87) PCT Pub. No.: WO2021/034068
PCT Pub. Date: Feb. 25, 2021

(65) Prior Publication Data
US 2022/0298318 A1 Sep. 22, 2022

(30) Foreign Application Priority Data
Aug. 16, 2019 (KR) .................. 10-2019-0100083

(51) Int. Cl.
*C08J 5/22* (2006.01)
*B01J 41/09* (2017.01)
*B01J 41/13* (2017.01)

(52) U.S. Cl.
CPC ............. *C08J 5/2287* (2013.01); *B01J 41/09* (2017.01); *B01J 41/13* (2017.01)

(58) Field of Classification Search
CPC ............. B01D 69/106; B01D 69/1214; B01D 2323/46; B01D 2325/18
(Continued)

(56) References Cited

U.S. PATENT DOCUMENTS 9,162,907 B2 * 10/2015 Kwon .................. C02F 1/4695
2017/0152362 A1 6/2017 Harada et al.
2017/0320053 A1 11/2017 Moon et al.

FOREIGN PATENT DOCUMENTS

EP 2520357 A1 7/2012
EP 3181618 A1 6/2017
(Continued)

OTHER PUBLICATIONS

Machine-generated translation of KR-10-2015-0010089, 21 pages, retrieved from KIPO on Dec. 9, 2024. (Year: 2015).*
(Continued)

*Primary Examiner* — Fred M Teskin
(74) *Attorney, Agent, or Firm* — Snell & Wilmer L.L.P.

(57) ABSTRACT

Provided are a monovalent anion selective ion exchange membrane and a method of manufacturing the ion exchange membrane. In regard to the monovalent anion selective ion exchange membrane, a surface portion thereof has a high amount ratio of a cation exchange polymer electrolyte, a central portion thereof has a high amount ratio of an anion exchange polymer electrolyte, and an amount ratio of the anion exchange polymer electrolyte with respect to the cation exchange polymer electrolyte continuously increases in the thickness direction thereof from the surface toward the center. Due to this structure, compared to monovalent anions, polyvalent anions may permeate much less through the exchange membrane. Thus, high selectivity for monovalent anions may be obtained.

12 Claims, 5 Drawing Sheets

(58) Field of Classification Search
USPC .......................................................... 521/27
See application file for complete search history.

(56) References Cited

FOREIGN PATENT DOCUMENTS

| EP | 3444295 A1 | 2/2019 |
|---|---|---|
| JP | H02265929 A | 10/1990 |
| JP | 2001049009 A | 2/2001 |
| JP | 2017164718 A | 9/2017 |
| KR | 101330571 B1 | 11/2013 |
| KR | 20150010089 A | 1/2015 |
| KR | 20160127201 A | 11/2016 |
| WO | 2015064820 A1 | 5/2015 |

OTHER PUBLICATIONS

JPO; Office Action dated Feb. 13, 2023 in Application No. 2022-509679.
EPO; Office Action dated Aug. 10, 2023 in Application No. 20855306.5.
KIPO; Office Action dated Feb. 17, 2021 in Application No. 10-2019-0100083.
KIPO; Notice of Allowance dated Jun. 23, 2021 in Application No. 10-2019-0100083.
WIPO; International Search Report dated Dec. 30, 2020 in Application No. PCT/KR2020/010951.

\* cited by examiner

MONOVALENT ANION SELECTIVE ION EXCHANGE MEMBRANE

CROSS-REFERENCE TO RELATED APPLICATIONS

This application is a national stage entry of International Patent Application No. PCT/KR2020/010951, filed Apr. 18, 2020, which claims priority to Korean Patent Application No. 10-2019-0100083 filed Aug. 16, 2019, the disclosures of which are hereby incorporated by reference in their entirety.

TECHNICAL FIELD

The present disclosure relates to a monovalent anion-selective ion-exchange membrane and a method of preparing the same.

BACKGROUND ART

Due to concerns about depletion of fossil fuels such as petroleum and coal, and global warming driven by the generation of carbon dioxide generated by the use of fossil fuels, there is a need to develop a new energy source that can replace such fossil fuels.

In this regard, various new and renewable energy sources, such as solar heat, biofuel, geothermal heat, and wind power, are currently being developed and studied worldwide, but these new and renewable energy sources still account for less than 10% of global energy consumption. Moreover, solar and wind power, which are being studied as promising alternative energy sources to fossil fuels, have disadvantages in terms of securing stable energy production amounts because their energy production is very sensitive to the surrounding climatic environment. Accordingly, there is growing interest in eco-friendly alternative energy sources which do not have any risk of depletion and are capable of generating energy stably.

On the other hand, for the eco-friendly alternative energy sources, a monovalent anion-selective ion-exchange membrane is required for the process of producing high-purity common salt using an electrodialysis process, the process of producing high-purity caustic soda, and the process of producing soft water. In addition, there is an urgent need for the development of an ion-exchange membrane with high monovalent anion selectivity in recovery of fermentation processes, the food industry, the pharmaceutical field, recovery of acid and heavy metal, and wastewater neutralization, in which monovalent ion selectivity is needed in the deionization process. Accordingly, in response to the above necessity, studies on monovalent anion-selective ion-exchange membranes are being actively conducted. However, the development of an ion-exchange membrane that selectively transmits only monovalent anions rather than polyvalent anions at a high rate, is still insufficient.

Accordingly, the inventors of the present application studied a monovalent anion-selective ion-exchange membrane and found that, by manufacturing an ion-exchange membrane in which an anion-exchange polymer electrolyte is formed in a central portion of a porous polymer support and a cation-exchange polymer electrolyte is formed on a surface portion thereof, monovalent anions could selectively permeate the ion-exchange membrane at a high rate, compared to polyvalent anions.

In this regard, Korean Patent Registration No. 10-1511990 discloses an ion-exchange membrane for a reverse electrodialysis apparatus, and a reverse electrodialysis apparatus including the same.

DESCRIPTION OF EMBODIMENTS

Technical Problem

The present disclosure has been designed to solve the above problems, and an embodiment of the present disclosure provides a monovalent anion selective ion exchange membrane.

In addition, another embodiment of the present disclosure provides a method of manufacturing a monovalent anion selective ion exchange membrane.

The technical problems to be achieved by the present disclosure are not limited to those described above, and other technical problems not mentioned can be clearly understood by those of ordinary skill in the art to which the present disclosure belongs from the description below.

Technical Solution to Problem

As a technical means for achieving the above-described technical problem, one aspect of the present disclosure provides a monovalent anion selective ion exchange membrane including:

a polymer support having a porous structure; and an ion exchange polymer electrolyte impregnated in the porous polymer support, wherein the ion exchange polymer electrolyte includes an anion exchange polymer electrolyte and a cation exchange polymer electrolyte, and the central portion of the porous polymer support is impregnated with the anion exchange polymer electrolyte and the surface portion of the porous polymer support is impregnated with the cation exchange polymer electrolyte.

The amount ratio of the anion exchange polymer electrolyte and the cation exchange polymer electrolyte may have a relationship of Equation 1:

$$A \geq B. \qquad \text{[Equation 1]}$$

In Equation 1, A is the amount ratio of the anion exchange polymer electrolyte to the cation exchange polymer electrolyte in the central portion of the porous polymer support, and B is the amount ratio of the anion exchange polymer electrolyte to the cation exchange polymer electrolyte in the surface portion of the porous polymer support, and The central portion is an area from the surface to a depth of 20% to 80% in the direction from the surface to the center with respect to 100% of the thickness of the porous polymer support, and the surface portion is an area from the surface to a depth of 0% to 20% in the direction from the surface to the center with respect to 100% of the thickness of the porous polymer support.

As being closer to the center from the surface in the thickness direction of the porous polymer support, the amount ratio of the anion exchange polymer electrolyte to the cation exchange polymer electrolyte may be increased.

The amount of the cation exchange polymer electrolyte may be 10 parts by weight to 40 parts by weight based on 100 parts by weight of the anion exchange polymer electrolyte.

The cation exchange polymer electrolyte may be obtained by crosslinking polymerization of a sulfonic acid-containing electrolyte monomer having an anionic group.

The sulfonic acid-containing electrolyte monomer having an anionic group may include a material selected from 2-acrylamide-2-methylpropanesulfonate sodium, vinylsulfonate sodium, vinylsulfonic acid, allyl sulfonate sodium, 2-methyl-2-propene-1-sulfonate sodium, 3-sulfopropyl acrylate sodium, and combinations thereof.

The anion exchange polymer electrolyte may be obtained by crosslinking polymerization of an electrolyte monomer of a quaternary ammonium salt having a cationic group.

The electrolyte monomer of the quaternary ammonium salt having a cationic group may include a material selected from (3-acrylamidopropyl)trimethylammonium chloride, (vinylbenzyl)trimethylammonium chloride, and combinations thereof.

The porous polymer support may have a pore volume of 40% to 50%, a pore size of 0.07 μm to 0.1 μm, and a thickness of 8 μm to 30 μm.

The thickness ratio of the monovalent anion selective ion exchange membrane to the thickness of the porous polymer support may be from 1.0 to 1.03.

In addition, another aspect of the present disclosure provides a method of manufacturing a monovalent anion selective ion exchange membrane, the method including:

impregnating a porous polymer support with an anion exchange precursor solution including an electrolyte monomer having a cationic group, a crosslinking agent, an initiator, and a solvent; forming an anion exchange polymer electrolyte in the central portion of the porous polymer support by irradiating light to the porous polymer support to cause a crosslinking reaction of the anion exchange precursor solution; impregnating the porous polymer support having the anion exchange polymer electrolyte formed therein with a cation exchange precursor solution including an electrolyte monomer having an anionic group, a crosslinking agent, an initiator, and a solvent; and forming a cation exchange polymer electrolyte on the surface portion of the porous polymer support by irradiating light to the porous polymer support impregnated with the cation exchange precursor solution to crosslink the cation exchange precursor solution.

The electrolyte monomer having a cationic group may be a quaternary ammonium salt electrolyte monomer.

The electrolyte monomer having an anionic group may be a sulfonic acid-containing electrolyte monomer.

The porous polymer support may be hydrophilized by a surfactant before being impregnated with the anion exchange precursor solution.

The method of manufacturing the monovalent anion selective ion exchange membrane may further include, prior to the formation of the anion exchange polymer electrolyte, compressing upper and lower films respectively on upper and lower portions of the porous polymer support by loading, onto a pressing roll, the upper film, the porous polymer support impregnated with the anion exchange precursor solution, and the lower film; and after forming the anion exchange polymer electrolyte, detaching, from a detachment roll, the polymer support including the formed anion exchange polymer electrolyte, the upper film, and the lower film.

The method of manufacturing the monovalent anion selective ion exchange membrane may further include, prior to the formation of the cation exchange polymer electrolyte, compressing upper and lower films respectively on upper and lower portions of the porous polymer support by loading, onto a pressing roll, the upper film, the porous polymer support impregnated with the cation exchange precursor solution, and the lower film; and after forming the cation exchange polymer electrolyte, detaching, from a detachment roll, the polymer support including the formed cation exchange polymer electrolyte, the upper film, and the lower film.

One surface of each of the upper film and the lower film in contact with the porous polymer support may have been subjected to a hydrophilic treatment.

The compression may be performed through a squeeze compression, and the sum of the thicknesses of the porous polymer support and the films loaded onto the pressing roll through the squeeze compression may have a value of 70% to 97% of the sum of the thicknesses before the loading.

Due to the detachment, the cross-linked polymer resin formed on the outside of the porous polymer support may be removed by being transferred onto the upper film and the lower film.

Advantageous Effects of Disclosure

According to an embodiment of the present invention, in relation to the monovalent anion selective ion exchange membrane, the surface portion has a high content ratio of cation exchange polymer electrolyte, and the central portion has a high content ratio of anion exchange polymer electrolyte, and as being closer to the center from the surface in the thickness direction, the content ratio of the anion exchange polymer electrolyte to the cation exchange polymer electrolyte is continuously increased. Due to this structure, the permeation of polyvalent anions through the exchange membrane is significantly reduced compared to that of monovalent anions, so that high selectivity to monovalent anions can be obtained.

The effects of the present disclosure are not limited to the above-described effects, and it should be understood to include all effects that can be inferred from the configuration of the disclosure described in the detailed description or claims of the present disclosure.

MODE OF DISCLOSURE

Hereinafter, the present disclosure will be described in more detail. However, the present disclosure may be embodied in various different forms, and the present disclosure is not limited by the embodiments described herein, and the present disclosure is defined only by the claims to be described later.

In addition, the terms used in the present disclosure are only used to describe specific embodiments, and are not intended to limit the present disclosure. The singular expression includes the plural expression unless the context clearly dictates otherwise. Throughout the entire specification of the present disclosure, "including" any component refers to a case where other components may be further included, rather than excluding other components, unless stated otherwise.

The first aspect of the present application provides a monovalent anion selective ion exchange membrane including:

a polymer support having a porous structure; and an ion exchange polymer electrolyte impregnated in the porous polymer support, wherein the ion exchange polymer electrolyte includes an anion exchange polymer electrolyte and a cation exchange polymer electrolyte, and the central portion of the porous polymer support is impregnated with the anion exchange polymer electrolyte and the surface portion of the porous polymer support is impregnated with the cation exchange polymer electrolyte.

Hereinafter, the monovalent anion selective ion exchange membrane according to the first aspect of the present application will be described in detail with reference to FIG. 1.

Figure 1:
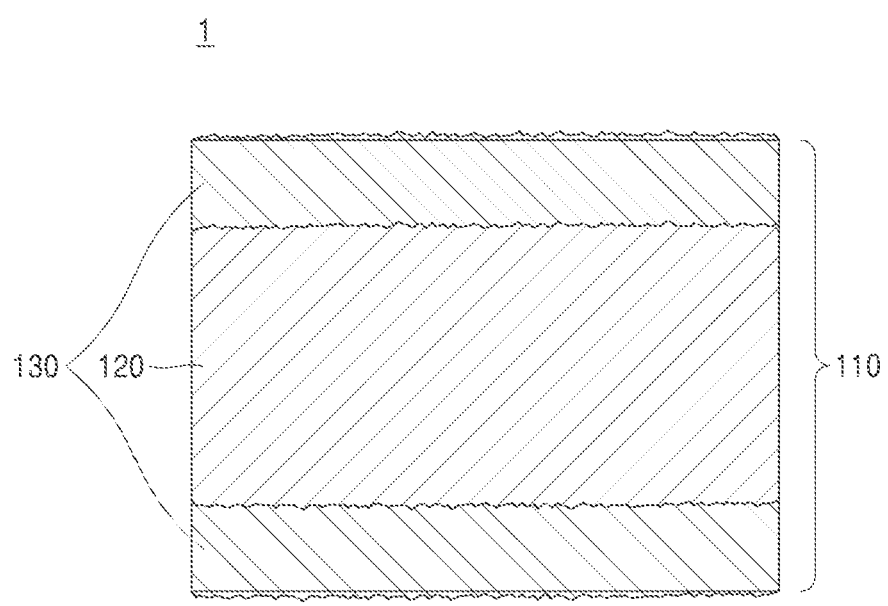
FIG. 1 shows a schematic diagram of a monovalent anion selective ion-exchange membrane according to an embodiment of the present disclosure.

In an embodiment of the present application, FIG. 1 is a schematic diagram showing a monovalent anion selective ion exchange membrane 1, and, throughout the present specification, an anion exchange polymer electrolyte 120 impregnated in the central portion of a polymer support 110 is impregnated not only in the central portion, but also partially in the surface portion, and a cation exchange polymer electrolyte 130 impregnated in the surface portion of the porous polymer support 110 is impregnated not only in the surface portion, but also partially in the central portion.

In an embodiment of the present application, in the monovalent anion selective ion exchange membrane 1, the cation exchange polymer electrolyte 130 having an anionic group is impregnated in the surface portion of the porous polymer support 110, so that, in the case of a polyvalent anions having a relatively large charge amount than a monovalent anion, due to a strong repulsive force with the anionic group of the cation exchange polymer electrolyte 130 impregnated in the surface portion, the polyvalent anions may not relatively permeate compared to the monovalent anion. On the other hand, in the case of the monovalent anion having a relatively small charge, due to the weak repulsive force with the cation exchange polymer electrolyte 130 having an anionic group compared to a polyvalent anion, the monovalent anion can permeate the cation exchange polymer electrolyte 130 relatively well and reach the anion exchange polymer electrolyte 120 impregnated in the central portion of the porous polymer support 110. As such, the monovalent anion selective ion exchange membrane 1 may be capable of selectively allowing monovalent anions alone to permeate therethrough.

In an embodiment of the present application, the amount ratio of the anion exchange polymer electrolyte 120 and the cation exchange polymer electrolyte 130 may have a relationship represented by Equation 1:

$$A \geq B. \quad \text{[Equation 1]}$$

In Equation 1, A is the amount ratio of the anion exchange polymer electrolyte 120 to the cation exchange polymer electrolyte 130 in the central portion of the porous polymer support 110, B is the amount ratio of the anion exchange polymer electrolyte 120 to the cation exchange polymer electrolyte 130 in the surface portion of the porous polymer support 110, and the central portion may be an area from the surface to a depth of 20% to 80% in the direction from the surface to the center with respect to 100% of the thickness of the porous polymer support 110, and the surface portion may be an area from the surface to a depth of 0% to 20% in the direction from the surface to the center with respect to 100% of the thickness of the porous polymer support 110. That is, in the area from the surface to a depth of 20% to 80% in the direction from the surface to the center with respect to 100% of the thickness of the porous polymer support 110, the amount of the anion exchange polymer electrolyte 120 may be equal to or greater than the amount of the cation exchange polymer electrolyte 130, and in the area from the surface to a depth of 0% to 20% in the direction from the surface to the center with respect to 100% of the thickness of the porous polymer support 110, the amount of the cation exchange polymer electrolyte 130 may be equal to or greater than the amount of the anion exchange polymer electrolyte 120. Therefore, the case in which the anion exchange polymer electrolyte 120 and the cation exchange polymer electrolyte 130 may all be distributed in the entire area (the central portion and the surface portion) of the porous polymer support 110 while the amount ratio of the anion exchange polymer electrolyte 120 and the central portion varies depending on the position inside the porous polymer support 110, is not excluded.

In an embodiment of the present application, the amount ratio of the anion exchange polymer electrolyte 120 to the cation exchange polymer electrolyte 130 may be increased from the surface to the center in the thickness direction of the porous polymer support 110. The amount ratio of the anion exchange polymer electrolyte 120 to the cation exchange polymer electrolyte 130 may be continuously increased from the surface to the center in the thickness direction of the porous polymer support 110, or may not be continuously increased. In the case of the non-continuous increase, the amount ratio of the anion exchange polymer electrolyte 120 to the cation exchange polymer electrolyte 130 at the interface between the surface portion and the central portion may be rapidly increased.

In an embodiment of the present application, the amount of the cation exchange polymer electrolyte 130 may be 10 parts by weight to 40 parts by weight based on 100 parts by weight of the anion exchange polymer electrolyte 120. When the amount of the cation exchange polymer electrolyte 130 is less than 10 parts by weight, polyvalent anions may also permeate through the monovalent anion selective ion exchange membrane 1, so that it is impossible to selectively allow monovalent anions alone to permeate, and when the amount of the cation exchange polymer electrolyte 130 is more than 40 parts by weight, there may be too many anionic groups in the cation exchange polymer electrolyte 130, which may cause even monovalent anions not to permeate.

In an embodiment of the present application, the anion exchange polymer electrolyte 120 may be obtained by crosslinking polymerization of an electrolyte monomer of a quaternary ammonium salt having a cationic group, and the electrolyte monomer of the quaternary ammonium salt may be represented by Formula 1:

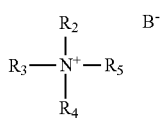

[Formula 1]

In Formula 1, $R_2$ to $R_5$ may each be a substituted or unsubstituted linear or branched alkyl or aryl, and B may be a halogen element.

In an embodiment of the present application, the electrolyte monomer of the quaternary ammonium salt having a cationic group may include a material selected from (3-acrylamidopropyl)trimethylammonium chloride, (vinylbenzyl)trimethylammonium chloride, and combinations thereof.

In an embodiment of the present application, the cation exchange polymer electrolyte 130 may be obtained by crosslinking polymerization of a sulfonic acid-containing electrolyte monomer having an anionic group, and the sulfonic acid-containing electrolyte monomer having an anionic group may be represented by Formula 2:

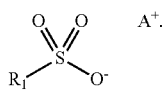

[Formula 2]

In Formula 2, $R_1$ may be a substituted or unsubstituted linear or branched alkyl or aryl, and A may be hydrogen or a metal element.

In an embodiment of the present application, the sulfonic acid-containing electrolyte monomer having an anionic group may include a material selected from 2-acrylamide-2-methylpropanesulfonate sodium, vinylsulfonate sodium, vinylsulfonic acid, allyl sulfonate sodium, 2-methyl-2-propene-1-sulfonate sodium, 3-sulfopropyl acrylate sodium, and combinations thereof.

In an embodiment of the present application, the porous polymer support 110 may include any material without limitation as long as the material is a hydrocarbon-based polymer, and may include, for example, a material selected from polyethylene, polypropylene, polyimide, polyamide-imide, polypropylene oxide, polyethersulfone, polyurethane, and combinations thereof.

In an embodiment of the present application, the porous polymer support 110 may have a pore volume of 40% to 50%, a pore size of 0.07 μm to 0.1 μm, and a thickness of 8 μm to 30 μm. When the porous polymer support 110 does not satisfy the above characteristics, the anion polymer electrolyte and the cation exchange polymer electrolyte may not be smoothly impregnated in the porous polymer support 110, so that the monovalent anion selective ion exchange membrane 1 may not be easily manufactured.

In an embodiment of the present application, the monovalent anion selective ion exchange membrane 1 may have no by-products on the surface thereof due to the removal of the crosslinked polymer resin on the outside of the porous polymer support 110. Accordingly, the thickness thereof may be small. This thinning of the monovalent anion selective ion exchange membrane 1 may be achieved when the monovalent anion selective ion exchange membrane 1 is manufactured according to a roll-to-roll process, which will be described in detail later provided in connection with the second aspect of the present application.

In an embodiment of the present application, the ratio of the thickness of the monovalent anion selective ion exchange membrane 1 to the thickness of the porous polymer support 110 may be 1.0 to 1.03. Since the anion exchange polymer electrolyte 120 and the cation exchange polymer electrolyte 130 are filled in the porous polymer support 110, the thickness of the monovalent anion selective ion exchange membrane 1 may be the same as the thickness of the porous polymer support 110, or as will be described later in connection with the second aspect, may be slightly greater than the thickness of the porous polymer support 110 due to the surface roughness that occurs when the cation exchange polymer electrolyte 130 is removed from the surface. When the thickness ratio is greater than 1.03, the cation exchange polymer electrolyte 130 may not be completely removed from the surface of the monovalent anion selective ion exchange membrane 1, which may act as a hindrance to ion exchange. For example, the thickness ratio may be 1.0 to 1.02.

The second aspect of the present application provides a method of manufacturing a monovalent anion selective ion exchange membrane, the method including:
impregnating a porous polymer support with an anion exchange precursor solution including an electrolyte monomer having a cationic group, a crosslinking agent, an initiator, and a solvent; forming an anion exchange polymer electrolyte in the central portion of the porous polymer support by irradiating light to the porous polymer support to cause a crosslinking reaction of the anion exchange precursor solution; impregnating the porous polymer support having the anion exchange polymer electrolyte formed therein with a cation exchange precursor solution including an electrolyte monomer having an anionic group, a crosslinking agent, an initiator, and a solvent; and forming a cation exchange polymer electrolyte on the surface portion of the porous polymer support by irradiating light to the porous polymer support impregnated with the cation exchange precursor solution to cause a crosslinking reaction of the cation exchange precursor solution.

Although a detailed description which has already provided in connection with the first aspect of the present application is omitted, the description of the first aspect of the present application may be equally applied even when the description thereof is omitted in the second aspect.

Figure 2:
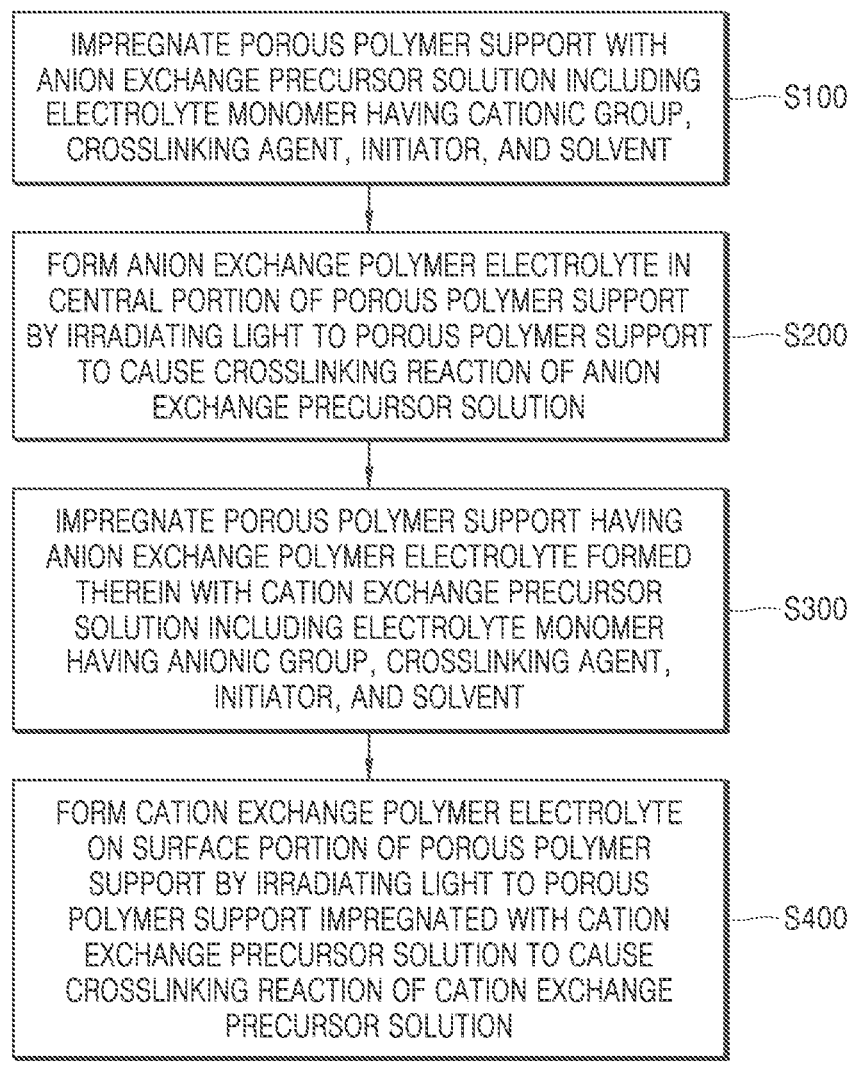
FIG. 2 shows a schematic diagram illustrating a method of manufacturing a monovalent anion selective ion-exchange membrane according to an embodiment of the present disclosure.
Figure 3:
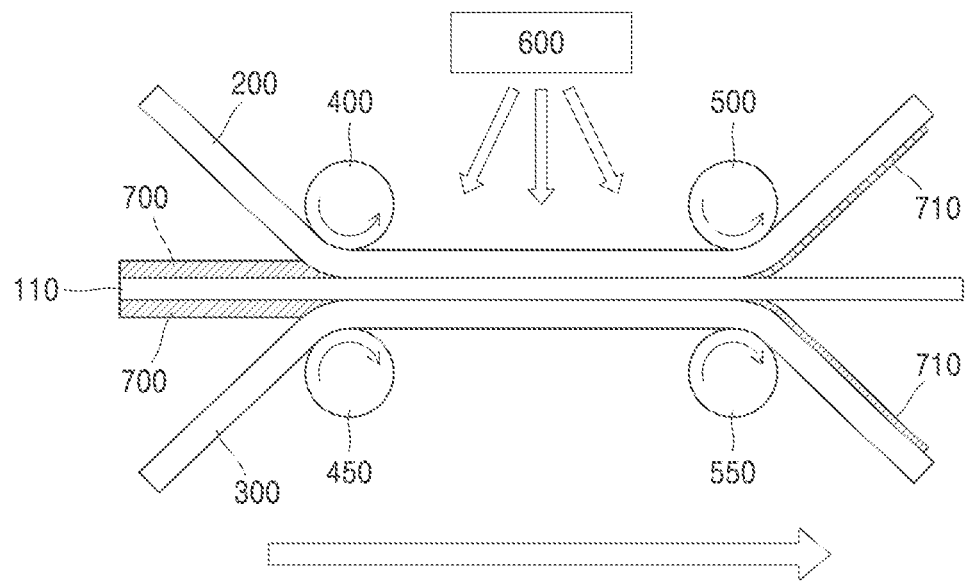
FIG. 3 shows a schematic diagram illustrating a roll-to-roll manufacturing process of a monovalent anion selective ion-exchange membrane according to an embodiment of the present disclosure.

Hereinafter, the method of manufacturing the monovalent anion selective ion exchange membrane according to the second aspect of the present application will be described in detail with reference to FIGS. 2 and 3 process by process. FIG. 2 shows a schematic diagram illustrating a method of manufacturing a monovalent anion selective ion exchange membrane according to an embodiment of the present disclosure, and FIG. 3 shows a schematic diagram of a roll-to-roll manufacturing process of a monovalent anion selective ion exchange membrane according to an embodiment of the present disclosure.

First, in an embodiment of the present application, the method of manufacturing the monovalent anion selective ion exchange membrane 1 includes impregnating the porous polymer support 110 with an anion exchange precursor solution 700 containing an electrolyte monomer having a cationic group, a crosslinking agent, an initiator, and a solvent (S100).

In an embodiment of the present application, the electrolyte monomer having a cationic group may be a quaternary ammonium salt electrolyte monomer, and may include, for example, a material selected from (3-acrylamidopropyl)

trimethylammonium chloride, (vinylbenzyl)trimethylammonium chloride, and combinations thereof.

In an embodiment of the present application, the crosslinking agent may be an acrylamide-based crosslinking agent having a tertiary amine functional group, which may be represented by Formula 3.

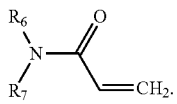

[Formula 3]

$R_6$ and $R_7$ in Formula 3 may each be a substituted or unsubstituted linear or branched alkyl or aryl.

In an embodiment of the present application, the acrylamide-based crosslinking agent having a tertiary amine functional group may include, for example, a material selected from N,N'-bis(acryloyl)piperazine, N,N'-(1,2-dihydroxyethylene)bisacrylamide, N,N'-methylenebisacrylamide, N,N'-methylenebismethacrylamide, and combinations thereof.

In an embodiment of the present application, the crosslinking agent affects the degree of crosslinking of the monovalent anion selective ion exchange membrane 1 to be manufactured, and the degree of swelling and mechanical properties of the ion exchange membrane may be controlled according to an amount thereof.

In an embodiment of the present application, the initiator may be a photoinitiator, for example, any one of the Darocur or Irgacure series manufactured by Ciba Geigy, Switzerland, or 2-hydroxy-2-methy-1-phenylpropane-1-one.

In an embodiment of the present application, the solvent may be a water-soluble solvent such as water, methanol, or ethanol. In an embodiment, the solvent may be water.

In an embodiment of the present application, the amount of the electrolyte monomer having a cationic group may be about 53 parts by weight to about 60 parts by weight, the amount of the crosslinking agent may be about 3 parts by weight to about 7 parts by weight, and the amount of the solvent may be about 33 parts by weight to about 44 parts by weight, and the amount of the initiator may be about 0.1 parts by weight to about 0.5 parts by weight based on 100 parts by weight of a solution in which the electrolyte monomer having a cationic group, a crosslinking agent, and a solvent are mixed. When the amount of the electrolyte monomer having a cationic group is smaller than the lower limit of the range, the ion exchange capacity capable of improving the ion conductivity of the manufactured ion exchange membrane may be insufficient, and when the amount of the electrolyte monomer having a cationic group is greater than the upper limit of the range, the durability of the manufactured ion exchange membrane may be reduced. In addition, when the amount of the crosslinking agent is smaller than the lower limit of the range, the durability of the manufactured ion exchange membrane may be reduced due to insufficient degree of crosslinking, and when the amount of the crosslinking agent is greater than the upper limit of the range, the degree of crosslinking is too high and thus, the ion conductivity of the manufactured ion exchange membrane may be significantly reduced. When the amount of the solvent is smaller than the lower limit of the range, the electrolyte monomer having a cationic group may be excessively impregnated in the porous polymer support, so that a relatively small amount of the electrolyte monomer having an anionic group, which will be described later, is impregnated. Therefore, the thickness of the cation exchange polymer electrolyte formed on the surface of the porous polymer support may be reduced, so that the ion exchange membrane manufactured may not achieve the effect of selectively exchanging monovalent anions. In addition, when the amount of the solvent is greater than the upper limit of the range, the electrolyte monomer having a cationic group may be impregnated in a small amount in the porous polymer support, so that the electrolyte monomer having an anionic group, which will be described later, may be relatively excessively impregnated. Therefore, the thickness of the cation exchange polymer electrolyte formed on the surface of the porous polymer support may be increased, so that the ion exchange membrane manufactured may not achieve the effect of selectively exchanging monovalent anions. That is, the amount of the solvent may play an important role in achieving the effect of selectively exchanging the monovalent anion in the present disclosure. In detail, the solvent may evaporate during the crosslinking reaction and thus, may expand the surface pores of the porous polymer support. Therefore, when the crosslinking reaction is performed by irradiating light to the porous support impregnated with the anion exchange precursor solution containing the electrolyte monomer having a cationic group, the solvent contained in the anion exchange precursor solution evaporates, and pores formed in the surface of the porous support may expand in size, and by additionally impregnating the expanded pores with the cation exchange polymer electrolyte solution and crosslinking the cation exchange polymer electrolyte solution, the anion exchange polymer electrolyte formed in the central portion and the cation exchange polymer electrolyte formed in the surface portion may have an appropriate thickness in the porous polymer support.

In an embodiment of the present application, the porous polymer support 110 may be hydrophilized by a surfactant before being impregnated with the anion exchange precursor solution 700. In this case, the surfactant may be any material that enables hydrophilization, and may be, for example, a material selected from dodecylbenzenesulfonic acid (DBSA), alkylbenzenesulfonic acid (ABS), linearalklybenzenesulfonic acid (LAS), alphasulfonic acid (AS), alphaolefinsulfonic acid (AOS), alcoholpolyoxyethyleneether (AE), alcoholpolyoxyethyleneethersulfonic acid (AES), and combinations thereof. In an embodiment, the surfactant may be dodecylbenzenesulfonic acid. When the hydrophobic portion of the surfactant is bonded to the surface of the porous polymer support 110, which is hydrophobic, by hydrophobic-hydrophobic interaction, the hydrophilic portion of the surfactant replaces the surface of the porous polymer support 110 to make the surface of the porous polymer support 110 hydrophilic. In this case, not only the outer surface of the porous polymer support 110 but also the entire inner pore surface thereof may be hydrophilized by the surfactant. Due to the hydrophilization of the entire pore surface, the anion exchange precursor solution 700, which is hydrophilic, can be effectively and easily filled into the pores by hydrophilic-hydrophilic interaction. In detail, the hydrophilization treatment may be performed to hydrophilize the pore surface in such a method in which the porous polymer support 110 is immersed in a solution obtained by diluting 0.5 part by weight to 1 part by weight of a commercially available surfactant in water for 1 to 2 minutes and then dried.

Next, in an embodiment of the present application, the method of manufacturing the monovalent anion selective ion exchange membrane 1 may include forming the anion exchange polymer electrolyte 120 in the central portion of the porous polymer support 110 by irradiating light to the porous polymer support 110 to cause a crosslinking reaction of the anion exchange precursor solution 700 (S200).

In an embodiment of the present application, the process S200 may be performed according to the roll-to-roll process shown in FIG. 3. In this case, before process S200, the process of loading an upper film 200, the porous polymer support 110 impregnated with the anion exchange precursor solution 700, and a lower film 300 onto a compression roll so as to compress the upper film 200 and the lower film 300 on an upper portion and a lower portion of the porous polymer support 110, respectively, and after process S200, the process of detaching, from a detachment roll, the porous polymer support 110 including the formed anion exchange polymer electrolyte, the upper film 200, and the lower film 300 may be further included. In this regard, the compression roll may include an upper compression roll 400 and a lower compression roll 450 which are spaced apart from each other in a vertical direction, that is, two compression rolls may be used, and the detachment roll may include an upper detachment roll 500 and a lower detachment roll 550 which are spaced apart from each other in a vertical direction, that is, two detachment rolls may be used. Hereinafter, a case in which the process S200 is performed using the roll-to-roll process, will be described in detail. However, this process is not limited to the roll-to-roll process.

In an embodiment of the present application, the upper film 200 and the lower film 300 may each be formed of poly(ethylene terephthalate) (PET).

In an embodiment of the present application, the thickness of each of the upper film 200 and the lower film 300 may be from about 30 $\mu$m to about 70 $\mu$m, or from about 50 $\mu$m to about 60 $\mu$m. When the thickness of each of the upper film 200 and the lower film 300 is less than 30 $\mu$m, the detachment of the porous polymer support 110 from the upper film 200 and the lower film 300 after the crosslinking reaction may not performed smoothly, and thus, the porous polymer support 110 may be torn. When the thickness of each of the upper film 200 and the lower film 300 exceeds 70 $\mu$m, the films are too thick and thus light may not be irradiated sufficiently to the porous polymer support 110, and thus, the crosslinking reaction may not occur sufficiently.

In an embodiment of the present application, one surface of each of the upper film 200 and the lower film 300 in contact with the porous polymer support 110, may not be subjected to a water-repellent treatment or may be subjected to a hydrophilic treatment.

The hydrophilic treatment may be, for example, a hydrophilic treatment with silicone, polyvinyl alcohol, polyallylamine hydrochloride, polyvinylamine, polystyrene sulfonic acid, polyvinyl sulfonic acid, or the like. The hydrophilic treatment may be a hydrophilic treatment with silicone. That is, by hydrophilizing one surface of the upper film 200 and the lower film 300 in contact with the porous polymer support 110, the bonding with the porous polymer support 110 hydrophilized by a surfactant, may be facilitated.

In an embodiment of the present application, the compression may be performed by a squeeze compression so as to obtain a value smaller than the sum of the thickness of the porous polymer support 110, the thickness of the upper film 200 and the thickness of the lower film 300 which are loaded onto the compression roll. In this case, the squeeze compression may be performed at a pressure of about 50 kgf/cm$^2$ to about 100 kgf/cm$^2$. That is, by more strongly bonding the porous polymer support 110 with the upper film 200 and the lower film 300 through the squeeze compression, a crosslinked polymer resin 710 formed on the outside of the porous polymer support 110 is more easily transferred onto the upper film 200 and the lower film 300 and removed.

In an embodiment of the present application, through a squeeze compression, the sum of the thicknesses of the porous polymer support and the films loaded onto the compression roll may have a value of 70% to 97% of the sum of the thicknesses before the loading. When the value is less than 70%, the detachment of the upper film 200 and the lower film 300 from the porous polymer support 110 may not be easily performed in the subsequent detachment process, and when the value exceeds 97%, in the subsequent detachment process, the crosslinked polymer resin 710 may not be removed because the crosslinked polymer resin 710 formed on the outside the porous polymer support 110 may not be transferred onto the upper film 200 and the lower film 300 well.

In an embodiment of the present application, the speed at which the upper film 200, the porous polymer support 110, and the lower film 300 are loaded onto the compression roll may be about 0.5 M/min to about 2 M/min. When the speed is less than 0.5 M/min, the process proceeds slowly and production efficiency may be reduced, and when the speed exceeds 2 M/min, the process proceeds quickly so that the crosslinking reaction of the anion exchange precursor solution 700 may not smoothly occur in the subsequent process.

In an embodiment of the present application, the crosslinking reaction of the anion exchange precursor solution 700 may be performed by irradiating light to the porous polymer support 110 on which the upper film 200 and the lower film 300 are compressed.

In this case, the irradiation of light may be performed on both the upper and lower portions of the porous polymer support 110 on which the upper film 200 and the lower film 300 are compressed.

In an embodiment of the present application, the irradiated light may be ultraviolet rays, and the types of ultraviolet rays may be classified into UVA, UVB and UVV, and the ultraviolet rays may have different wavelength bands. Specifically, UVA may have a wavelength band of about 320 nm to about 400 nm, UVB may have a wavelength band of about 280 nm to about 320 nm, and UVV may have a wavelength band of about 400 nm to about 450 nm.

In an embodiment of the present application, the energy of the irradiated ultraviolet rays may be, in the case of UVA, about 40 mW/cm$^2$ to about 50 mW/cm$^2$, in the case of UVB, about 30 mW/cm$^2$ to about 50 mW/cm$^2$, and in the case of UVV, 30 mW/cm$^2$ to about 50 mW/cm$^2$. In an embodiment of the present application, the energy of the irradiated ultraviolet rays may be, in the case of UVA, about 47 mW/cm$^2$, in the case of UVB, about 37 mW/cm$^2$, and in the case of UVV, about 35 mW/cm$^2$. When the energy of the irradiated ultraviolet light is less than these ranges, the crosslinking reaction of the anion exchange precursor solution 700 may not proceed smoothly. When the energy of the irradiated ultraviolet light is outside the upper limits, the energy is too strong and thus, the porous polymer support 110, the upper film 200, and the lower film 300 may be carbonized.

In an embodiment of the present application, the irradiation of ultraviolet rays may be performed, in the case of UVA, for about 360 seconds to about 480 seconds, in the case of UVB, for about 360 seconds to about 480 seconds, and, in the case of UVV, for about 360 seconds to about 480 seconds. When the UV irradiation is performed for less than the lower limits, the crosslinking reaction of the anion exchange precursor solution 700 may not proceed smoothly. When the UV irradiation is performed for more than the upper limits, the porous polymer support 110, the upper film 200, and the lower film 300 may be carbonized.

In an embodiment of the present application, the process S200 may further include, after the formation of the anion exchange polymer electrolyte 120 as described above, detaching, from a detachment roll, the porous polymer support 110 including the formed anion exchange polymer electrolyte 120, the upper film 200, and the lower film 300.

In an embodiment of the present application, by the detachment, the crosslinked polymer resin 710 formed on the outside of the porous polymer support 110 may be transferred onto the upper film 200 and the lower film 300 and removed.

In an embodiment of the present application, the interval between the upper detachment roll 500 and the lower detachment roll 550 may be equal to the sum of the thicknesses of the porous polymer support 110 and the upper film 200, and the lower film 300 before loading. In this case, the porous polymer support 110 before being loaded onto the compression roll may refer to the porous polymer support 110 before being impregnated with the anion exchange precursor solution 700. That is, the thickness of the porous polymer support 110 may be the thickness of the porous polymer support 110 that does not include the anion exchange precursor solution 700.

In an embodiment of the present application, the detachment can be made by pulling the upper film 200 and the lower film 300 that have passed the detachment roll on other sides. In this regard, the directions of the other sides may be diagonal directions from the upper detachment roll 500 and the lower detachment roll 550.

Then, in an embodiment of the present application, the method of manufacturing the monovalent anion selective ion exchange membrane 1 includes impregnating the porous polymer support 110 in which the anion exchange polymer electrolyte 120 has been formed therein with a cation exchange precursor solution 700 containing an electrolyte monomer having an anionic group, a crosslinking agent, an initiator, and a solvent (S300).

In an embodiment of the present application, the electrolyte monomer having an anionic group may be a sulfonic acid-containing electrolyte monomer, and may be, for example, a material selected from 2-acrylamide-2-methyl-propanesulfonate sodium, vinylsulfonate sodium, vinylsulfonic acid, allyl sulfonate sodium, 2-methyl-2-propene-1-sulfonate sodium, 3-sulfopropyl acrylate sodium, and combinations thereof.

In an embodiment of the present application, the crosslinking agent and the initiator may be the same as those used in process S100.

In an embodiment of the present application, in the cation exchange precursor solution 700, about 44 parts by weight to about 47 parts by weight of the electrolyte monomer having an anionic group, about 6 parts by weight to about 12 parts by weight of the crosslinking agent, and about 44 parts by weight to about 47 parts by weight of the solvent may be mixed, and the amount of the initiator may be about 0.1 parts by weight to about 0.5 parts by weight based on 100 parts by weight of a solution in which the electrolyte monomer having an anionic group, the crosslinking agent, and the solvent may be mixed. When the amount of the electrolyte monomer having an anionic group is smaller than the lower limit of the range, the ion exchange capacity capable of improving the ion conductivity of the manufactured ion exchange membrane 1 may be insufficient, and when the amount of the electrolyte monomer having a anionic group is greater than the upper limit of the range, the durability of the manufactured ion exchange membrane 1 may be reduced. In addition, when the amount of the crosslinking agent is smaller than the lower limit of the range, the durability of the manufactured ion exchange membrane 1 may be reduced due to insufficient degree of crosslinking, and when the amount of the crosslinking agent is greater than the upper limit of the range, the degree of crosslinking is too high and thus, the ion conductivity of the manufactured ion exchange membrane 1 may be significantly reduced.

Next, in an embodiment of the present application, the method of manufacturing the monovalent anion selective ion exchange membrane includes forming a cation exchange polymer electrolyte on the surface portion of the porous polymer support by irradiating light to the porous polymer support impregnated with the cation exchange precursor solution to cause the crosslinking reaction of the cation exchange precursor solution. (S400)

In an embodiment of the present application, the process S400 may be performed according to the roll-to-roll process as shown in FIG. 3 in the same manner as the process S200, and the following process is the same as described above and thus, the description will be omitted.

In an embodiment of the present application, the amount of the cation exchange polymer electrolyte 130 may be 10 parts by weight to 40 parts by weight based on 100 parts by weight of the anion exchange polymer electrolyte 120. When the amount of the cation exchange polymer electrolyte 130 is less than 10 parts by weight, polyvalent anions may also permeate through the monovalent anion selective ion exchange membrane 1, so that it is impossible to selectively allow monovalent anions alone to permeate, and when the amount is more than 40 parts by weight, there may be too many anionic groups in the cation exchange polymer electrolyte 130, which may cause even monovalent anions not to permeate.

In an embodiment of the present application, in the monovalent anion selective ion exchange membrane 1 prepared above, the cation exchange polymer electrolyte 130 may not be formed on the outside of the porous polymer support 110, and the porous structure of the porous polymer support 110 may be exposed on the surface of the monovalent anion selective ion exchange membrane 1.

In an embodiment of the present application, the wording "the cation exchange polymer electrolyte 130 may not be formed on the outside of the porous polymer support 110" should be interpreted as including a case where the cation exchange polymer electrolyte 130 can be formed on at least a portion of the outside of the porous polymer support 110. In addition, the wording "the porous structure of the porous polymer support 110 is exposed on the surface of the monovalent anion selective ion exchange membrane 1" should be interpreted as including a case where at least a portion thereof may be exposed, and should be interpreted as a case where the porous structure of the surface of the porous polymer support 110 is exposed.

In an embodiment of the present application, the monovalent anion selective ion exchange membrane 1 may have no by-products on the surface thereof due to the removal of the crosslinked polymer resin formed on the outside of the porous polymer support 110. Accordingly, the thickness of the ion exchange membrane 1 may be small.

In an embodiment of the present application, the weight ratio of the porous polymer support 110 and the ion exchange polymer electrolyte (the anion exchange polymer electrolyte 120 and the cation exchange polymer electrolyte 130) may be 1:0.8 to 1:1.1. When the weight ratio of the ion exchange polymer electrolyte filled in the porous polymer support 110 is less than 1:0.8, the ion exchange polymer electrolyte may not sufficiently be filled, so that it may be difficult to express the physical and electrochemical properties of an ion exchange membrane to be implemented. When the weight ratio is greater than 1:1.1, the polymer electrolyte may remain on the surface of the monovalent anion selective ion exchange membrane 1, so that it may be difficult to form a uniform ion exchange membrane.

Hereinafter, embodiments of the present disclosure will be described in detail in such a manner those of ordinary skill in the art can easily carry out the present disclosure.

However, the present disclosure may be embodied in several different forms and is not limited to the embodiments described herein.

<Example> Preparation of Monovalent Anion Selective Ion Exchange Membrane

Filling with Anion Exchange Polymer Electrolyte

A polymerization solution in which 99% (vinylbenzyl) trimethylammonium chloride, 1,4-acryloylpiperazine, and water were mixed in a weight ratio of 12:1:9, was prepared, and 0.01 weight ratio of an initiator solution in which N,N'-azobisisobutyronitrile was diluted in methanol at a 10 weight ratio, was used. Then, a porous polyethylene support with a thickness of 16 μm and a pore distribution of 45% was impregnated with the mixed solution so that a monomer could sufficiently penetrate into the support. Then, with the porous polyethylene support positioned between two polyethylene terephthalate (PET) films, in the case of UVA, ultraviolet rays with an intensity of 47 mW/cm², in the case of UVB, ultraviolet rays with an intensity of about 37 mW/cm², and in the case of UVV, ultraviolet rays with an intensity of about 35 mW/cm² were irradiated to proceed the crosslinking reaction. After performing the crosslinking process, the PET films were removed and by-products attached to the surface of the support were removed to primarily obtain an anion exchange membrane.

2. Filling with Cation Exchange Polymer Electrolyte

In order to fill a cation exchange polymer electrolyte on both surfaces of the anion exchange membrane prepared according to 1. Filling with anion exchange polymer electrolyte, the anion exchange membrane prepared according to 1. was impregnated with a solution in which 99% acrylamide-2-methyl-1-propanesulfonic acid, 1,4-acryloylpiperazine, and water were mixed at a weight ratio of 12:1:12 so as to allow the solution to sufficiently permeate into the insufficiently-filled pores on the surface portion of the anion exchange membrane, and then, with the anion exchange membrane between two polyethylene terephthalate (PET) films, again, in the case of UVA, ultraviolet rays with an intensity of 47 mW/cm², in the case of UVB, ultraviolet rays with an intensity of about 37 mW/cm², and in the case of UVV, ultraviolet rays with an intensity of about 35 mW/cm² were irradiated to proceed the crosslinking reaction. Then, the PET films were removed and by-products on the surface of the support were removed to obtain a monovalent selective anion exchange membrane.

<Comparative Example> Preparation of Commercial Anion Exchange Membrane (AMV)

A commercially available monovalent anion exchange membrane (Asahi Glass, Japan) was used for comparison with the example.

Experimental Example

Figure 4:
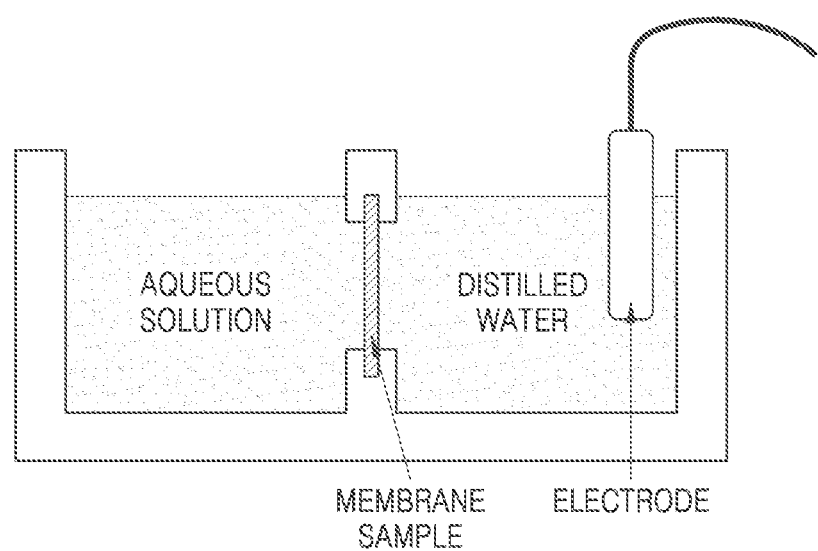
FIG. 4 shows a schematic diagram of an apparatus for measuring conductivity in a solution so as to calculate the membrane permeability of monovalent anion selective ion-exchange membranes according to an Example and Comparative Example of the present disclosure.
Figure 5A:
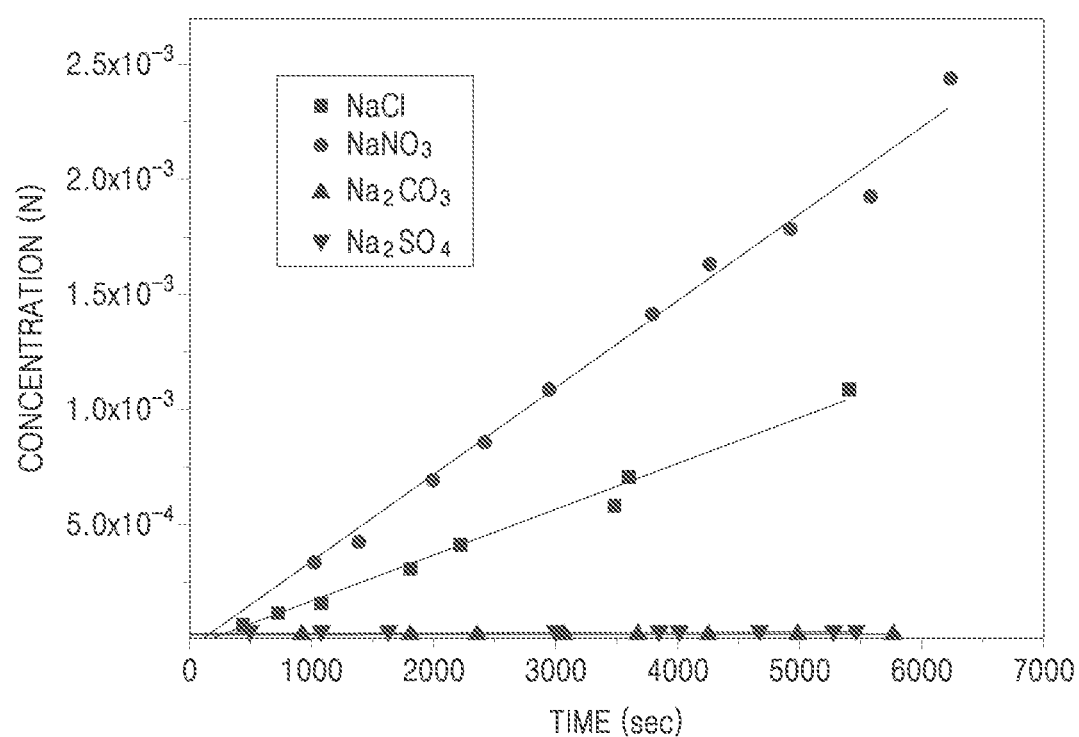
FIGS. 5A and 5B show graphs showing the results of measuring change in concentration with respect to change in time so as to calculate the membrane permeability of the monovalent anion selective ion-exchange membrane according to Example (FIG. 5A) and Comparative Example (FIG. 5B) of the present disclosure.
Figure 5B:
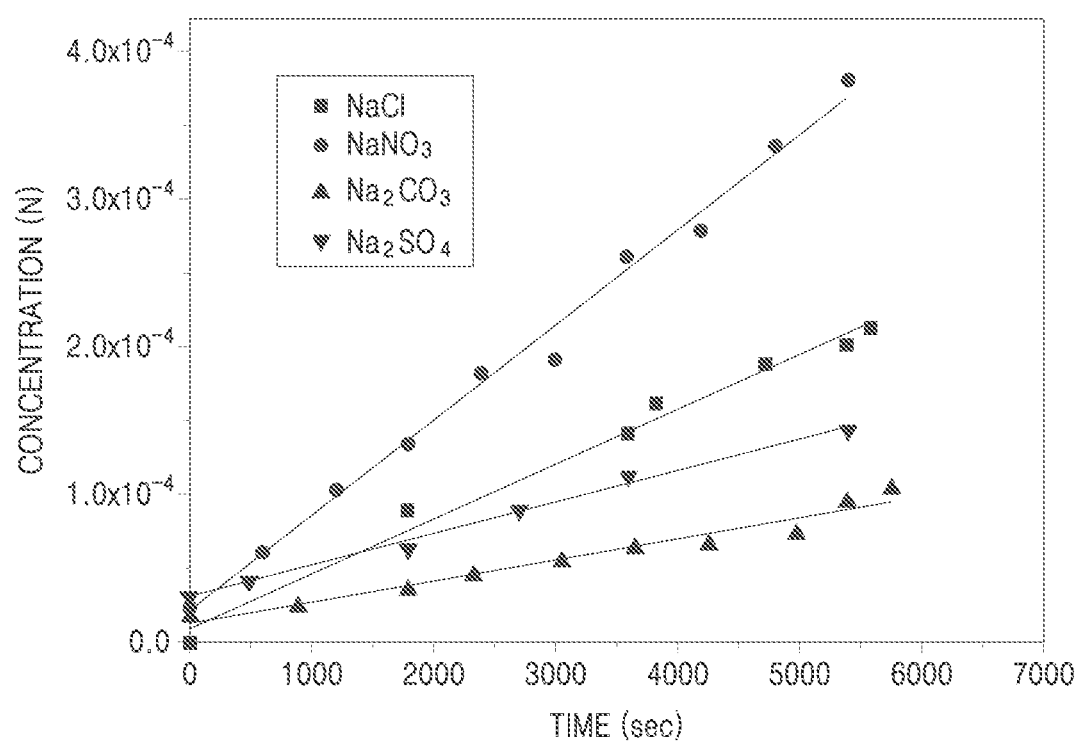

After the ion exchange membranes according to the example and the comparative example were mounted on the measuring device shown in FIG. 4, an aqueous solution of sodium chloride, sodium nitrate, sodium carbonate, or sodium sulfate having a 1 normal concentration was placed in the container on the left side of the membrane, and distilled water was placed in the container on the right side of a membrane. Conductivity was measured for 2 hours to determine the amount of ions in the aqueous solution permeating through the membrane sample over time. The results were converted into concentrations by measuring the conductivity of each solution at each concentration to illustrate the change in the concentration over time, which is illustrated in FIG. 5. FIG. 5A shows a graph showing the result data obtained using the ion exchange membrane according to the example, and FIG. 5B shows a graph showing the result data obtained using the ion exchange membrane according to the comparative example.

In addition, the results obtained by calculating the membrane permeability ($P_{crossover}$) for ion crossover using the following equations are shown in Table 1 below.

$$P_{Crossover} = \frac{VLC_B(t)}{C_A A(t-t_o)}, X = \frac{C_B(t)}{t-t_o}, P = X\frac{VL}{C_A A}.$$

(where, V is the volume of solution supplied in the same amount to both sides of the cell for permeability measurement (the side containing the ion and the pure water side) (cm³), L is the thickness of the ion exchange membrane used to measure the permeability (cm), A is the effective area (cm²) of the ion exchange membrane used to measure the permeability, $C_A$ is the initial ion concentration (M) in the solution containing the corresponding ion, $C_B(t)$ is the concentration (M) of the corresponding ion crossed over the pure water side according to the time change, t is the changed time (s) at the time of measurement, and to is the initial time (s) before the measurement)

TABLE 1

| | Permeability (cm²/s) | |
| --- | --- | --- |
| Sample | Example | Comparative Example |
| NaCl | $5.26 \times 10^{-9}$ | $6.87 \times 10^{-9}$ |
| NaNO$_3$ | $1.01 \times 10^{-8}$ | $1.26 \times 10^{-8}$ |
| Na$_2$CO$_3$ | $2.36 \times 10^{-11}$ | $2.65 \times 10^{-9}$ |
| Na$_2$SO$_4$ | $5.92 \times 10^{-11}$ | $4.29 \times 10^{-9}$ |

According to FIG. 5 and Table 1, unlike the commercial monovalent anion selective ion exchange membrane according to the comparative example, the monovalent anion selective ion exchange membrane according to the example of the present application shows that the degree of permeation of monovalent anions (Cl⁻, NO$_3^-$) was significantly higher than the degree of permeation of divalent anions (CO$_3^{2-}$ and SO$_4^{2-}$). Thus, it can be seen that the selectivity for monovalent anions was significantly superior to that of the anion exchange membrane according to the comparative example.

The invention claimed is:

1. A monovalent anion selective ion exchange membrane, comprising:
    a polymer support having a porous structure; and an ion exchange polymer electrolyte impregnated in the porous polymer support,
wherein the ion exchange polymer electrolyte includes an anion exchange polymer electrolyte and a cation exchange polymer electrolyte,
a central portion of the porous polymer support is impregnated with the anion exchange polymer electrolyte,
a surface portion of the porous polymer support is impregnated with a cation exchange polymer electrolyte, and
the porous polymer support has a pore volume of 40% to 50%, a pore size of 0.07 μm to 0.1 μm, and a thickness of 8 μm to 30 μm.

2. The monovalent anion selective ion exchange membrane of claim 1, wherein an amount ratio of the anion exchange polymer electrolyte to the cation exchange polymer electrolyte has a relationship of Equation 1:

$$A \geq B. \qquad \text{[Equation 1]}$$

wherein, in Equation 1,
A is an amount ratio of the anion exchange polymer electrolyte to the cation exchange polymer electrolyte, in the central portion of the porous polymer support,
B is an amount ratio of the anion exchange polymer electrolyte to the cation exchange polymer electrolyte, in the surface portion of the porous polymer support,
the central portion is an area from the surface to a depth of 20% to 80% in the direction from the surface to the center with respect to 100% of the thickness of the porous polymer support, and
the surface portion is an area from the surface to a depth of 0% to 20% in the direction from the surface to the center with respect to 100% of the thickness of the porous polymer support.

3. The monovalent anion selective ion exchange membrane of claim 1, wherein as being closer to the center from the surface in the thickness direction of the porous polymer support, the amount ratio of the anion exchange polymer electrolyte to the cation exchange polymer electrolyte is increased.

4. The monovalent anion selective ion exchange membrane of claim 1, wherein an amount of the cation exchange polymer electrolyte is 10 parts by weight to 40 parts by weight based on 100 parts by weight of the anion exchange polymer electrolyte.

5. The monovalent anion selective ion exchange membrane of claim 1, wherein the cation exchange polymer electrolyte is obtained by crosslinking polymerization of a sulfonic acid-containing electrolyte monomer having an anionic group.

6. The monovalent anion selective ion exchange membrane of claim 5, wherein the sulfonic acid-containing electrolyte monomer having an anionic group includes a material selected from 2-acrylamide-2-methylpropane-sulfonate sodium, vinylsulfonate sodium, vinylsulfonic acid, allyl sulfonate sodium, 2-methyl-2-propene-1-sulfonate sodium, 3-sulfopropyl acrylate sodium, and combinations thereof.

7. The monovalent anion selective ion exchange membrane of claim 1, wherein the anion exchange polymer electrolyte is obtained by crosslinking polymerization of an electrolyte monomer of a quaternary ammonium salt having a cationic group.

8. The monovalent anion selective ion exchange membrane of claim 7, wherein the electrolyte monomer of a quaternary ammonium salt having a cationic group includes a material selected from (3-acrylamidopropyl)trimethylammonium chloride, (vinylbenzyl)trimethylammonium chloride, and combinations thereof.

9. The monovalent anion selective ion exchange membrane of claim 1, wherein a thickness ratio of the monovalent anion selective ion exchange membrane to a thickness of the porous polymer support is 1.0 to 1.03.

10. A method of manufacturing a monovalent anion selective ion exchange membrane, the method comprising:
impregnating a porous polymer support with an anion exchange precursor solution comprising an electrolyte monomer having a cationic group, a crosslinking agent, an initiator, and a solvent;
forming an anion exchange polymer electrolyte in a central portion of the porous polymer support by irradiating light to the porous polymer support to cause a crosslinking reaction of the anion exchange precursor solution;
impregnating the porous polymer support having the anion exchange polymer electrolyte formed therein, with a cation exchange precursor solution including an electrolyte monomer having an anionic group, a crosslinking agent, an initiator, and a solvent; and
forming a cation exchange polymer electrolyte on the surface portion of the porous polymer support by irradiating light to the porous polymer support impregnated with the cation exchange precursor solution, to cause a crosslinking reaction of the cation exchange precursor solution,
wherein the porous polymer support is hydrophilized by a surfactant before being impregnated with the anion exchange precursor solution.

11. The method of claim 10, wherein the electrolyte monomer having a cationic group is a quaternary ammonium salt electrolyte monomer.

12. The method of claim 10, wherein the electrolyte monomer having an anionic group is a sulfonic acid-containing electrolyte monomer.

* * * * *